United States Patent [19]

Katayama

[11] Patent Number: 4,745,735
[45] Date of Patent: May 24, 1988

[54] GRASS COLLECTING CONTAINER FOR GRASS MOWER

[75] Inventor: Takao Katayama, Sennan, Japan

[73] Assignee: Kubota, Ltd., Osaka, Japan

[21] Appl. No.: 947,239

[22] Filed: Dec. 29, 1986

[30] Foreign Application Priority Data

Jan. 7, 1986 [JP] Japan ............................ 61-789[U]
Sep. 4, 1986 [JP] Japan ...................... 61-135882[U]

[51] Int. Cl.[4] .......................................... A01D 34/70
[52] U.S. Cl. ...................................................... 56/202
[58] Field of Search ................................ 56/202, 16.6

[56] References Cited

U.S. PATENT DOCUMENTS

| | | | |
|---|---|---|---|
| 2,955,402 | 10/1960 | Strasal | 56/202 |
| 2,955,404 | 10/1960 | Strasal et al. | 56/202 |
| 2,983,095 | 8/1961 | Barth | 56/202 |
| 4,104,852 | 8/1970 | Tackett | 56/202 |
| 4,250,698 | 2/1981 | Pappalardo et al. | 56/202 |
| 4,265,079 | 5/1981 | Hoffman | 56/202 |
| 4,478,031 | 10/1984 | Wolf | 56/202 |
| 4,522,019 | 6/1985 | Edwards et al. | 56/202 |

*Primary Examiner*—Paul J. Hirsch
*Attorney, Agent, or Firm*—Edwin E. Greigg

[57] ABSTRACT

A grass collecting container attached to a walking type grass mower and the like. The grass collecting container has a container body, a mesh member for dividing space inside the container body between a ventilating space and a mowed grass depositing section, ventilating openings defined in right and left side walls of the container body, a convex portion defined in an upper wall of the container body and a handle disposed inside the convex portion for forming a substantially same plane as an upper face of the container body. The mesh member is downwardly inclined at right and left end portions thereof and at the same time the mesh member is placed in secure contact with a face of the convex portion inwardly of the container body.

6 Claims, 3 Drawing Sheets

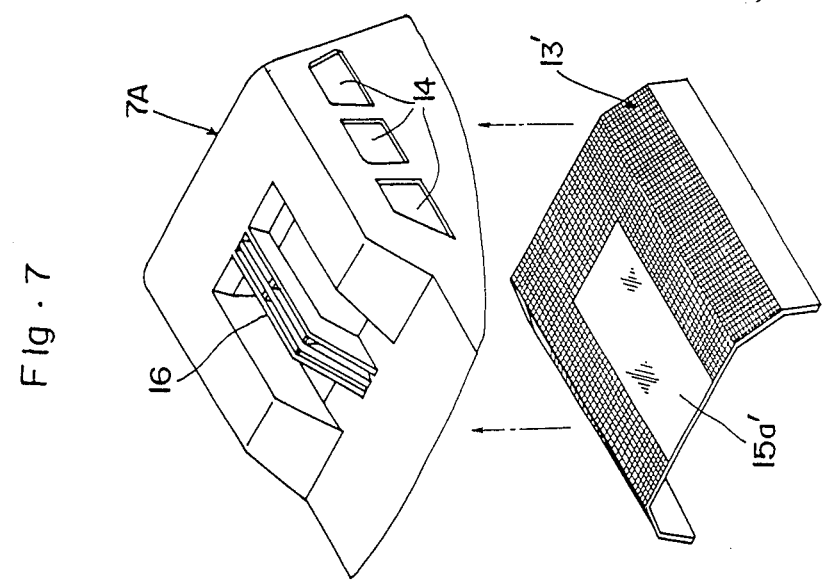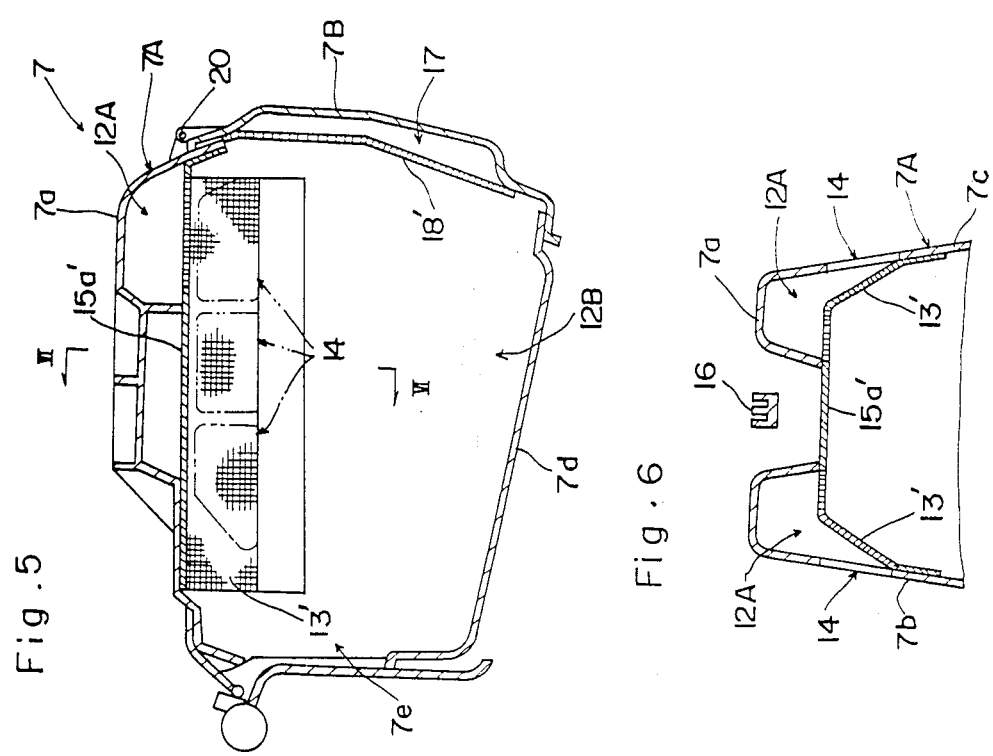

GRASS COLLECTING CONTAINER FOR GRASS MOWER

BACKGROUND OF THE INVENTION

The present invention relates to improvement of a grass collecting container attached to a vehicle body of a grass mower and adapted for depositing mowed grass, e.g. mowed lawn.

With grass collecting containers of this type, since mowed grass, e.g. mowed lawn is forcibly taken into a body of the container with blowing air, it is necessary to exhaust the blowing air from the inside of the container to the ambience. Therefore, there have been provided in the prior art various ways to carry out this air exhausting operation such as the container per se is formed of material having good ventilation characteristics or of a mesh member or further such as the container formed of synthetic resin has a large numer of pores for exhausting air in all walls thereof, i.e. upper and lower walls, right and left walls and a rear wall also.

However, according to the above-described conventional constructions, a problem arises that the air taken into the container is exhausted in all directions from the respective walls of the container along with fine dust contained in the exhausted air. This causes a health hazard especially when the container is attached to a walking type grass mower as the dust is directly blown against an operator situated behind the vehicle body.

SUMMARY OF THE INVENTION

The main object of the present invention is to provide a grass collecting container which is as free as possible from the unfavorable multi-directional air disperson especially protecting the operator against the dust and further which is formed compact as a whole and at the same time is conveniently constructed for reliably and effectively emptying the container of the mowed grass without leaving much of the same in the container.

In order to accomplish the above object, a grass collecting container for a grass mower related to the present invention comprises a container body attachable to a vehicle body of the grass mower and having forwardly thereof a grass collecting opening, a mesh member stretchedly disposed inside the container body for forming a ventilating space between an upper wall of the container body and for forming a mowed grass depositing section between a lower wall of the container body, the mesh member being downwardly inclined in the vicinity of right and left end portions thereof and being in contact with right and left side walls of the container body, exhaust air ventilating openings defined in the right and left side walls, the exhaust air ventilating openings being defined in the right and left side walls upwardly of the contact portions with the mesh member and at the same time in communication with the ventilating space, a convex portion defined at a right and left intermediate portion of the upper wall of the container body, the convex portion being constructed to permit the mesh member to be placed in secure contact with a face of the convex portion inwardly of the container body and a handle disposed inside the convex portion, the handle being constructed to be in substantially the same plane as an upper face of the container body.

That is to say, the mesh member divides the space inside the container between an upper ventilating space and a lower grass depositing section. The mowed grass is deposited in the grass depositing section and the exhaust air is carried through the mesh member to the upper ventilating space. With this construction, as the exhaust air is sidewardly discharged from the exhaust air openings defined in the right and left side walls of the container, the exhaust air containing the dust is not discharged from the upper wall nor from the rear wall of the container. Thus, even if the container is attached to the walking type grass mower, the dust is not blown against the operator behind the vehicle body.

In addition, as the upper wall of the container defines the convex portion which includes therein the handle such that the upper face of the handle is placed in substantially the same plane as the upper face of the container without the handling considerably projecting upwardly from the container, the container as a whole may be formed compact and at the same time a plurality of the containers may be transported compactly by being vertically stacked on each other. Furthermore, as the mesh member is in secure contact with the inner face of the convex portion of the container, it is possible to prevent the mesh member from being raised by the blowing exhaust air, thereby extending the life of the mesh member.

Moreover, since the mesh member is in contact with the right and left walls in the vicinity of right and left end portions thereof being downwardly inclined, it is possible to effectively prevent the mowed grass from being stuck at the intercrossing portions between the mesh member and the right and left sidewalls. More particularly, if the mesh member is in contact with or fixed to the right and left side walls with the right and left end portions thereof being disposed to be substantially horizontal, the intercrossing portions form substantially a right angle respectively whereby the mowed grass is easily stuck therein and this stuck grass may be left un-discharged in the grass discharging operation. In contrast to this, with the construction of the present invention, since the intercrossing portions between the mesh member and the right and left side walls form an obtuse angle respectively, the mowed grass is never stuck therein whereby the grass discharging operation may be carried out effectively and reliably without leaving any grass un-discharged.

Further objects and advantages of the present invention will become more apparent from the following description.

BRIEF DESCRIPTION OF THE DRAWINGS

The accompanying drawings illustrate embodiments of a grass collecting container related to the present invention, in which:

FIG. 5 is a vertically sectional side view of a grass collecting container of another embodiment of the present invention;

FIG. 6 is a section view of the grass collecting container taken on line VI—VI of FIG. 5; and FIG. 7 is an exploded perspective view showing main portions of the grass collecting container shown in FIG. 5.

DESCRIPTION OF THE PREFERRED EMBODIMENTS

Figure 1:
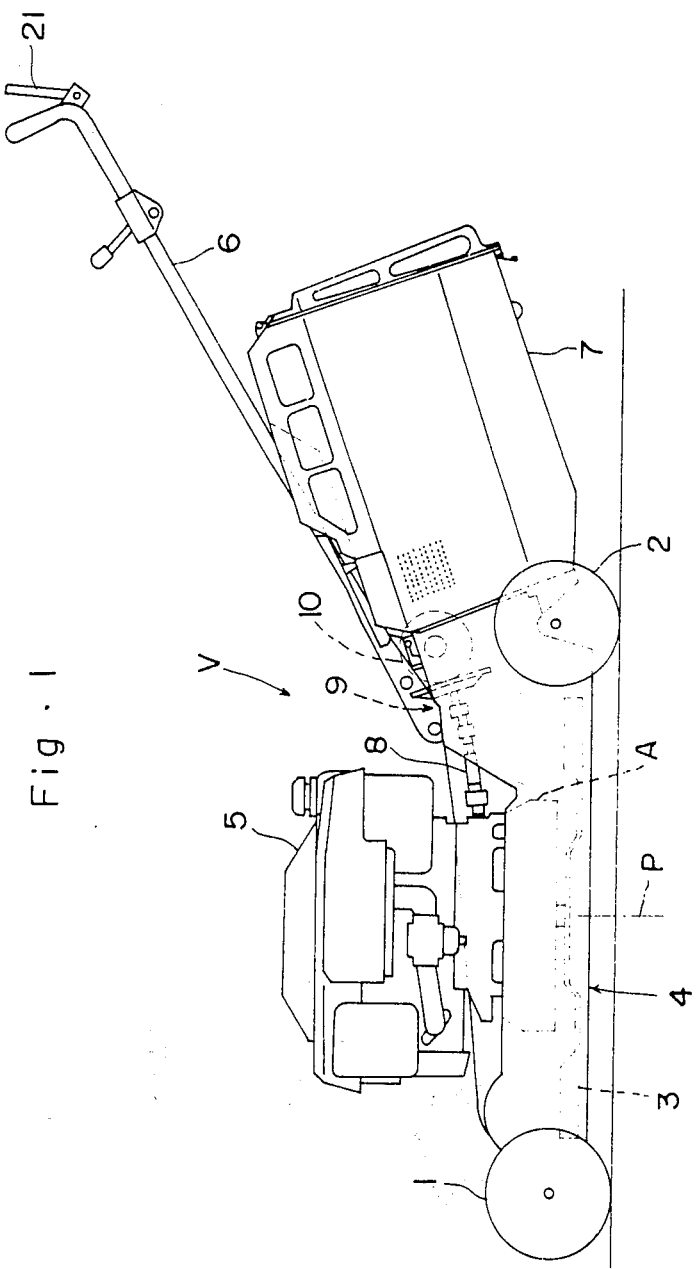
FIG. 1 is a side view showing the grass collecting container attached to a walking type grass mower.

FIG. 1 shows an automotive walking type grass mower comprising right and left front wheels 1, 1 and rear wheels 2, 2 disposed downwardly of a vehicle body V. The vehicle body V includes a cutting blade housing 4 accommodating a cutting blade 3 such that the cutting blade 3 is rotatable about a vertical axis P. The housing 4 includes at an upper side thereof an engine 5. An output of the engine 5 is transmitted through a cutting blade clutch A to the cutting blade 3 and at the same time a part of the output of the engine 5 is transmitted through a power transmission shaft 8, a disk type stepless change speed device 9 and through a differential mechanism 10 to the rear wheels 2, 2. The vehicle body V further includes at a rear portion thereof a steering handle 6, downwardly of which is placed a grass collecting container 7 detachably attached to the vehicle body V.

Figure 2:
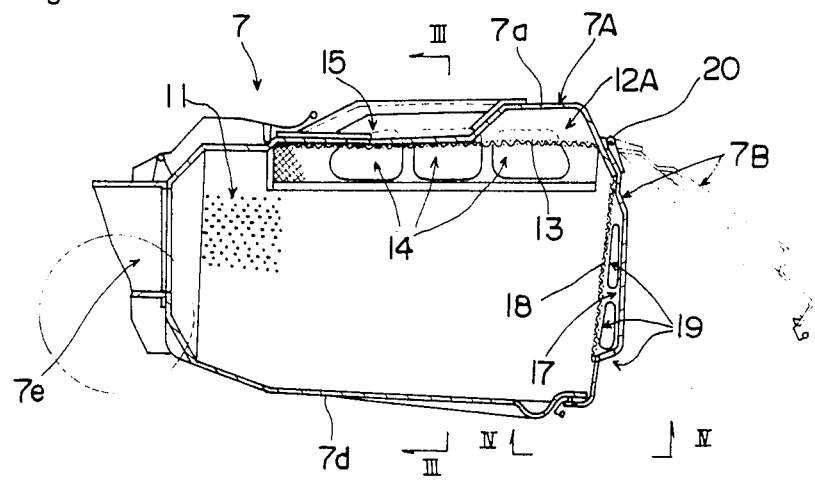
FIG. 2 is a partially cut-out side view of the grass collecting container.
Figure 3:
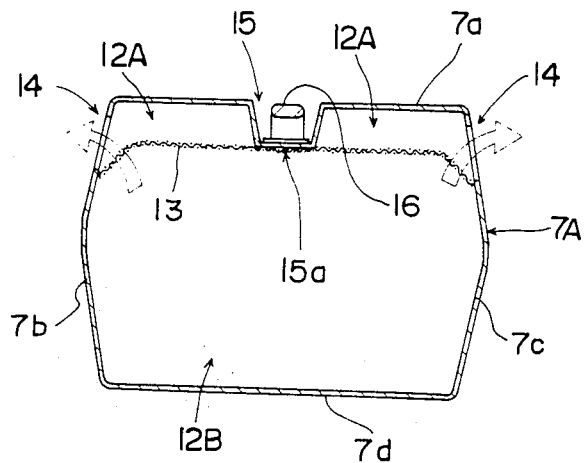
FIG. 3 is a section view taken on line III—III of FIG. 2.
Figure 4:
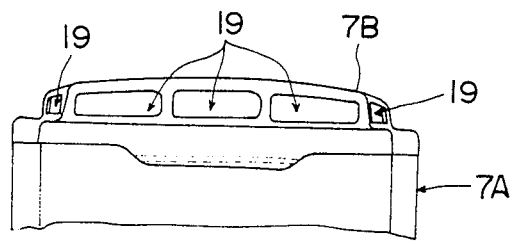
FIG. 4 is a view viewed from line IV—IV of FIG. 2.

FIGS. 2 through 4 show in greater detail the grass collecting container 7. This grass collecting container 7 includes a container body 7A and a lid cover 7B both of which are formed of synthetic resin by the injecting blow molding method. The container body 7A defines forwardly thereof a grass collecting opening 7e. Upper and forward portions of right and left side walls 7c, 7b of the container body 7A define a large number of ventilating pores 11 for discharging exhaust air. The container body 7A includes at an inner upper portion thereof a mesh member 13 stretched out therein for forming a ventilating space 12A in between an upper wall 7a of the container and for forming a mowed grass depositing section 12B for depositing mowed grass on a lower wall 7d. This mesh member 13 formed of a metal mesh, a punched metal plate and of the like is, as shown in FIG. 3, is downwardly inclined at right and left end portions thereof and is in secure contact with the right and left side walls 7c, 7b of the container body 7A. The secure contact portions with the mesh member 13 air ventilating openings 14 respectively are communicated with the ventilating space 12A. The upper wall 7a of the container body 7A defines at a right and left intermediate portion thereof a convex portion 15 inside which is provided a handle 16 for supporting the grass collecting container 7. This handle 16 is formed integrally with the container body 7A and is constructed such that an upper face of the handle 16 is positioned on substantially the same plane as the upper face of the container body 7A. Further, since the mesh member 13 is in contact with a face of an inwardly projecting portion 15a of the convex portion 15, the mesh member 13 is prevented from being raised upwardly by blowing exhaust air.

To the lid cover 7B is attached a mesh member 18 formed of a metal mesh or of a punched metal plate such that a ventilating space 17 is formed between an inner face thereof and the mesh member 18. The lid cover 7B defines at both sides and at a lower portion thereof a plurality of vent openings 19 communicating with the ventilating space 17. An upper end of the lid cover 7B is connected by means of a hinge 20 to a rear upper portion of the container body 7A whereby the lid cover 7B and the mesh member 18 are togetherwith swung-opened and closed after releasing engagement between a rear lower portion of the container 7A and a lower portion of the lid cover 7B.

In short, the exhaust air blown out through the mesh member 18 disposed rearwardly of the grass collecting container 7 is discharged through the vent openings 19 defined in the both sides and lower face of the lid cover 7B. Further, since the ventilating openings 14 and the ventilating pores 11 permit the exhaust air to flow smoothly inside the glass collecting container 7, it is possible to deposit the mowed grass successively from the rear portion of the grass collecting container 7 in greater concentration.

It is to be noted here that a reference numeral 21 in FIG. 1 denotes a clutch lever for engaging and disengaging the cutting blade clutch A.

FIGS. 5 through 7 show another embodiment of the grass collecting container 7. Since the basic construction of this container is substantially the same as that shown in FIGS. 2 through 4, the same components provided with the same reference marks will not be described further and only the differences will be particularly described next.

In the previous embodiment, the mesh members 13, 18 are formed of the metal mesh or of the punched metal plate; whereas, in this embodiment, members 13', 18' are formed of synthetic resin by the injection blow molding method. The convex portion 15 defined in the upper wall 7a of the container body 7A is upwardly and downwardly opened. A face of inwardly projecting portion 15a' of the convex portion 15 is formed integrally with the mesh member 13'. This face 15a' and a lid cover 7B' are both formed of transparent synthetic resin.

Accordingly, as shown in FIG. 6, when the mesh member 13' is securely attached to the container body 7A, the transparent face 15a' is positioned downwardly of the handle 16, whereby the operator is able to visually confirm a depositing condition of the mowed grass through the face 15a' or the lid cover 7B'. Also, since the mesh member 13' is formed integrally with the face 15a' being fixed thereto, the mesh member 13' is prevented from being raised by the blowing exhaust air in a same manner as in the previous embodiment.

It is to be noted that when the face 15a' is formed of the transparent synthetic resin this face 15a' and the mesh member 13' may be independently provided with only the face 15a' being transparent. Further, the face 15a' and the mesh member 13' may be formed integrally with each portion both being formed of the transparent synthetic resin.

In the previous embodiment also, it is possible to form the face 15a of the transparent synthetic resin such that the operator may visually confirm the depositing condition of the mowed grass. In this case, the face 15a may be formed integrally with the container body 7A or may be provided independently of the container body 7A to be fixedly attached to the same. Further, the mesh member 13 may be placed in contact with or be fixed to the face 15a thereby to restrict the mesh member 13 from rising upwardly.

I claim:

1. A grass collecting container for a lawn mower comprising a container body arranged to be attached to a vehicle body of said lawn mower, said container body including a grass collecting front opening, a rear wall, top and bottom walls and laterally spaced side walls, said side walls further having oppositely disposed ventilating openings positioned in proximity to said top wall, a depressed area extending medially of said top wall, a handle in said depressed area, said handle including an upper face which lies in substantially the same plane as an upper face of said top wall, and a mesh member engaging said depressed area in said top wall and further including terminal side portions arranged to engage each of said side walls beneath said ventilating openings, said mesh member and said top wall defining a ventilating space therebetween which is in communication with said ventilating openings.

2. A grass collecting container as claimed in claim 1, further wherein said top wall includes an upstanding U-shaped area having forwardly extending leg portions and outer areas which merge with said side walls and said rear wall, and said handle is positioned in a crotch between said leg portions.

3. A grass collecting container as claimed in claim 1, further wherein said mesh member is constructed of synthetic resin and includes a window.

4. A grass collecting container as claimed in claim 1, wherein said depressed area in said top wall includes a transparent portion underlying said handle.

5. A grass collecting container, as claimed in claim 3, further comprising:
   a lid cover hingedly attached tos aid rear wall of said container body and adapted to be freely opened and closed to reveal and cover an opening in said rear wall.

6. A grass collecting container as claimed in claim 5, further wherein:
   a second mesh member is attached to said lid cover for forming a ventilating space between an inner face of said lid cover, and
   a plurality of vent openings defined at both sides and a lower portion of said lid cover, said vent openings being in communication with said ventilating space of said lid cover.

* * * * *